(12) United States Patent
Barksdale et al.

(10) Patent No.: US 11,227,512 B2
(45) Date of Patent: Jan. 18, 2022

(54) TUBE TAG FOR LIFTING SLINGS

(71) Applicant: Etched, LLC, Kansas City, MO (US)

(72) Inventors: Adam Charles Barksdale, Kansas City, MO (US); Mark Ronald Stang, Kansas City, MO (US)

(73) Assignee: Etched, LLC, Kansas City, MO (US)

( * ) Notice: Subject to any disclaimer, the term of this patent is extended or adjusted under 35 U.S.C. 154(b) by 0 days.

(21) Appl. No.: 16/787,979

(22) Filed: Feb. 11, 2020

(65) Prior Publication Data
US 2021/0012684 A1    Jan. 14, 2021

Related U.S. Application Data

(60) Provisional application No. 62/873,427, filed on Jul. 12, 2019.

(51) Int. Cl.
*G09F 3/02* (2006.01)
*G09F 3/00* (2006.01)

(52) U.S. Cl.
CPC .............. *G09F 3/02* (2013.01); *G09F 3/0295* (2013.01); *G09F 2003/0266* (2013.01)

(58) Field of Classification Search
CPC .................................................. G09F 3/0295
See application file for complete search history.

(56) References Cited

U.S. PATENT DOCUMENTS

| | | | | |
|---|---|---|---|---|
| 3,672,006 A * | 6/1972 | Fidrych | ................. | F16G 11/02 24/122.6 |
| 4,162,095 A * | 7/1979 | Archer | ..................... | G09F 3/00 294/74 |
| 5,398,825 A * | 3/1995 | Erwin | ..................... | B66C 13/40 200/309 |
| 6,063,458 A * | 5/2000 | Robertson | ................ | G09F 3/00 219/76.1 |
| 6,170,145 B1* | 1/2001 | Lucas | ..................... | B21F 15/06 29/282 |
| D514,625 S * | 2/2006 | Segura | .......................... | D20/22 |
| 2009/0212913 A1* | 8/2009 | Barksdale | ................ | G09F 3/02 340/10.1 |
| 2010/0327710 A1* | 12/2010 | Kolton | ................ | G06K 19/041 312/223.1 |
| 2016/0293062 A1* | 10/2016 | Mazella | .................. | F16G 11/02 |

* cited by examiner

*Primary Examiner* — Gary C Hoge
(74) *Attorney, Agent, or Firm* — Polsinelli PC; Adam C. Rehm

(57) ABSTRACT

Wire rope tube tags are described that include chemically etched wire rope information on an outer surface of the tube tag. A flat sheet of metal may be etched to include wire rope-related information on a surface of the flat sheet of metal that may then be folded into a desired shape, such as a cubic tube, spherical tube, triangular tube, etc., to create a wire rope tube tag with the wire rope information on the outer surface of the tag. Several methods for attaching the folded tube tag are provided, including one or more holes located through the body of the tube tag through which a wire thread or zip tie may pass and one or more tabs extending from the tube tag that may be bent toward or angled toward the wire rope sling to pinch the wire rope and hold the tag in place.

20 Claims, 9 Drawing Sheets

TUBE TAG FOR LIFTING SLINGS

CROSS-REFERENCE TO RELATED APPLICATIONS

This application is related to and claims priority under 35 U.S.C. § 119(e) from U.S. Patent Application No. 62/873,427, filed Jul. 12, 2019 entitled "TUBE TAG FOR LIFTING SLINGS," the entire contents of which is incorporated herein by reference for all purposes.

TECHNICAL FIELD

Aspects of the present disclosure generally relate to manufacture of wire rope tags for lifting slings, and more specifically for tube wire rope tags formed from folding or bending of a flat, metal sheet.

BACKGROUND

Ropes comprised several twisted strands of wire are often used in lifting or rigging apparatuses, such as cranes, elevators, mining apparatuses, logging, excavation machines, and the like, for lifting heavy objects. Such wire ropes or wire rope slings are often required to be tagged or labeled to provide lifting capability information of the wire rope, along with other information. For example, wire rope tags or sling tags may be labeled with the diameter of the wire rope, the length of the wire rope, lifting capabilities of the wire rope (such as an upper limit of pounds or other weight that may be safely lifted with the wire rope, one or more identifications of the manufacturer of the wire rope (including, in some instances, a logo of the manufacturing company, an address of the company, a phone number of the company, etc.), and the like. These wire rope tags are typically attached, in some manner, to the corresponding wire rope such that users of the wire rope can visually verify the lifting capabilities of the rope being used in the lifting or rigging operation. However, traditional wire rope tags are problematic for a variety of reasons.

FIGS. 1A-1C illustrate various styles and/or types of prior art wire rope tags. In particular, FIG. 1A illustrates a typical flat wire rope tag, FIG. 1B illustrates a cylindrical wire rope tag, and FIG. 1C illustrates a rectangular wire rope tag. Flat wire rope tags 102 may generally be comprised of stainless steel and/or aluminum of various alloys of any thickness. Graphics or text 104 may be printed on one or both sides of the flat rope tags 102 to convey the wire rope capabilities. An attachment hole 106 may be located through the flat tag 102 to attach the wire rope by threading a thin wire cable of the wire rope through the hole 106. However, when attached, the flat wire rope tag 102 is left dangling from the wire rope and is vulnerable to being damaged or snagged from the when the wire rope tag is used.

Alternative wire rope tag designs may be less likely to be removed from the wire rope, but have additional drawbacks. For example, the cylindrical wire rope tag 108 of FIG. 1B and the rectangular wire rope tag 112 of FIG. 10 may collectively be referred to as "tube tags". Attachment of the tube tags 108, 112 to the wire rope generally includes feeding the wire rope through the center of the tube tag 108, 112 during manufacturing of the wire rope such that the tag 108, 112 does not hang free on the wire rope. However, this method of attachment requires the tube tags to be attached to the wire rope during manufacturing of the rope itself and limits any after-market attachment. Further, to manufacture the tube tag 108, 112, an extruded tube in the shape of the tube tag 108, 112 is created that is cut into the desired tube tag length with the wire rope information physically etched with an engraver into an outer surface of the tag. As such, production of tube tags 108, 112 are typically expensive and time consuming, with customization of such tube tags 108, 112 being limited as extruded tubes or pipes are often limited to a finite number of sizes. Further, significant limitations in providing useful and desirable wire rope information on the tube tag may be present as branding the tags with a company logo may be both time consuming and limited. In particular, current chemical etching equipment is designed only for flat sheets of metal, such that methods for providing information on the outer surface of a tube tag 108, 112 is limited and generally not desirable in conveying sufficient wire rope information.

SUMMARY

One aspect of the present disclosure relates to a tag for a wire rope sling comprising a flat sheet of metal comprising an etched surface, the flat sheet of metal folded to form a tube-shaped wire rope tag with the etched surface comprising an outer surface of the tube-shaped wire rope tag, a first edge, and a second edge opposite the first edge that is welded to the first edge to form the tube-shaped wire rope tag from the folded sheet of metal. Further, when folded, the tube-shaped wire rope tag comprises may include a first open end and a second open end in which a wire rope portion of the wire rope sling passes through the first open end and the second open end, wherein the etched outer surface comprises information corresponding to the wire rope sling.

The tag for the wire rope sling may have three sides, four sides, five sides, six sides, or more. In one embodiment, the tag may further include a first attachment hole in a first portion of the etched surface, wherein an attachment cable is fed through the first attachment hole and connects to the wire rope portion of the wire rope sling and, in some embodiments, a second attachment hole in a second portion of the etched surface, wherein the attachment cable is fed through the first attachment hole and the second attachment hole and connects to the wire rope portion of the wire rope sling.

In another embodiment, the tag may include a first attachment tab and a second attachment tab, wherein each of the first attachment tab and the second attachment tab extends from a first end of the folded tube-shaped wire rope tag, the first attachment tab and the second attachment tab being on opposite sides of the folded tube-shaped wire rope tag. Each of the first attachment tab and the second attachment tab may be biased toward a center of the folded tube-shaped wire rope tag, the attachment tabs creating a pinching force on the wire rope portion of the wire rope sling passing through the first open end and the second open end.

In still another embodiment, the tag may further include a radio-frequency identification device to transmit identification information corresponding to the folded tube-shaped wire rope tag.

The information corresponding to the wire rope sling of the tag may be chemically-etched into the outer surface and comprises load-bearing limitations of the wire rope and/or one or more graphical design objects.

Another aspect of the present disclosure relates to a method for a tagging a wire rope sling. The method may include the operations of etching a first surface of a flat sheet of metal with information corresponding to the wire rope sling, folding the flat sheet of metal to form a tube-shaped wire rope tag device, wherein an outer surface of the tube-shaped wire rope tag device comprises the first surface of the flat sheet of metal, and welding a first edge of the flat sheet of metal to a second edge, opposite the first edge, of the flat sheet of metal to form the tube-shaped wire rope tag device from the folded sheet of metal, the tube-shaped wire rope tag device comprising a first open end and a second open end in which a wire rope portion of the wire rope sling passes through the first open end and the second open end.

BRIEF DESCRIPTION OF THE DRAWINGS

The foregoing and other objects, features, and advantages of the present disclosure set forth herein should be apparent from the following description of particular embodiments of those inventive concepts, as illustrated in the accompanying drawings. The drawings depict only typical embodiments of the present disclosure and, therefore, are not to be considered limiting in scope.

DETAILED DESCRIPTION

Aspects of the present disclosure involve wire rope tube tags and systems, devices, and methods for generating wire rope tube tags that include chemically etched wire rope information on an outer surface of the tube tag. In one implementation, a flat sheet of metal may be chemically etched through any number of chemical-etching techniques to include wire rope-related information on a surface of the flat sheet of metal. Other etching or marking techniques may also be used on the flat sheet of metal to show the wire rope-related information, such as screen printing, engraving, stamping, and/or laser marking. The flat sheet of metal may then be folded into a desired shape, such as a cubic tube, spherical tube, triangular tube, etc., to create a wire rope tube tag with the wire rope information on the outer surface of the tag. Further, one or more edges of the tube tag may be defined on the flat metal sheet through a stitch cut or other scoring line cut into the flat sheet of metal to indicate lines along with the flat sheet may be folded to create the tube tag. The unfolded edges of the tube tag may then be welded together to form a complete wire rope tube tag with chemically etched outer surfaces. In general, the flat sheet of metal may be of any material, including steel or aluminum, and may vary in thickness and size to customize the length and inner diameter of the tube tag. In some instances, the welding of the edges of the tube tag may be tack welded, stitch welded, fully welded, or held together through any other method of connecting metal edges together.

The folded tube tag may be connected to a wire rope in several ways. In some implementations, the folded tube tag may be welded around the wire rope such that the wire rope passes through the center of the tube tag. To hold the folded tube tag in place on the wire rope, one or more holes may be located through the flat sheet of metal such that, upon folding, a wire thread or zip tie may be used to hold the tube tag onto the wire rope. In other embodiments, one or more tabs may extend from one end of the folded tube tag that may be configured to be bent toward and pinch the wire rope to hold the tag in place. Further, the folded tube tag may include some combination of holes and tabs to attach the tube tag to the wire rope. The flat sheet of metal from which the folded tube tag is formed may also be etched with the wire rope information and provided to a customer or field technician who may then fold and weld the flat sheet as desired to form the tube tag around the corresponding wire rope. As tube tags are generally attached during manufacturing of the wire rope, providing the flat sheet of metal to the customer on site may allow the customer to replace a broken or missing tag on an already purchased wire rope or sling, improving the safety of use of the wire rope or sling. The chemically-etched, folded tube tag thus provides various advantages over previous wire rope tags discussed above.

Figure 1B:
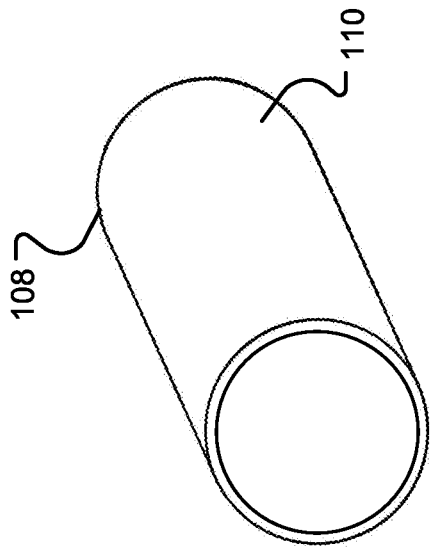
FIGS. 1A-1C are isometric views of prior art wire rope tags used for conveying lifting capabilities of the connected wire rope.
Figure 1A:
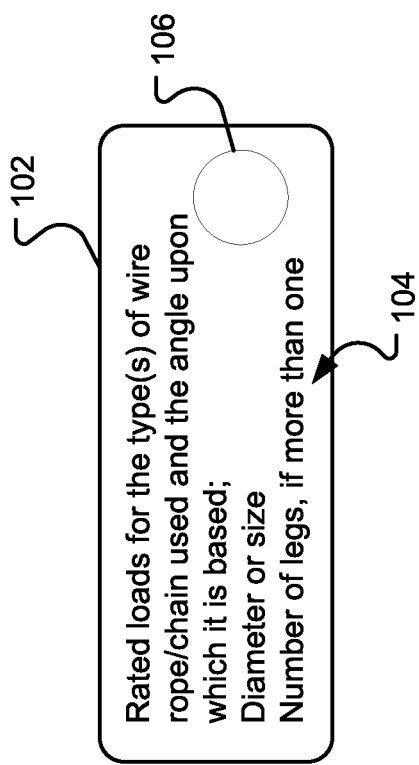
Figure 1C:
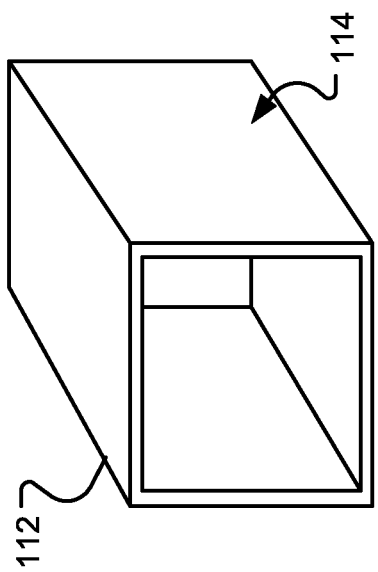
Figure 2:
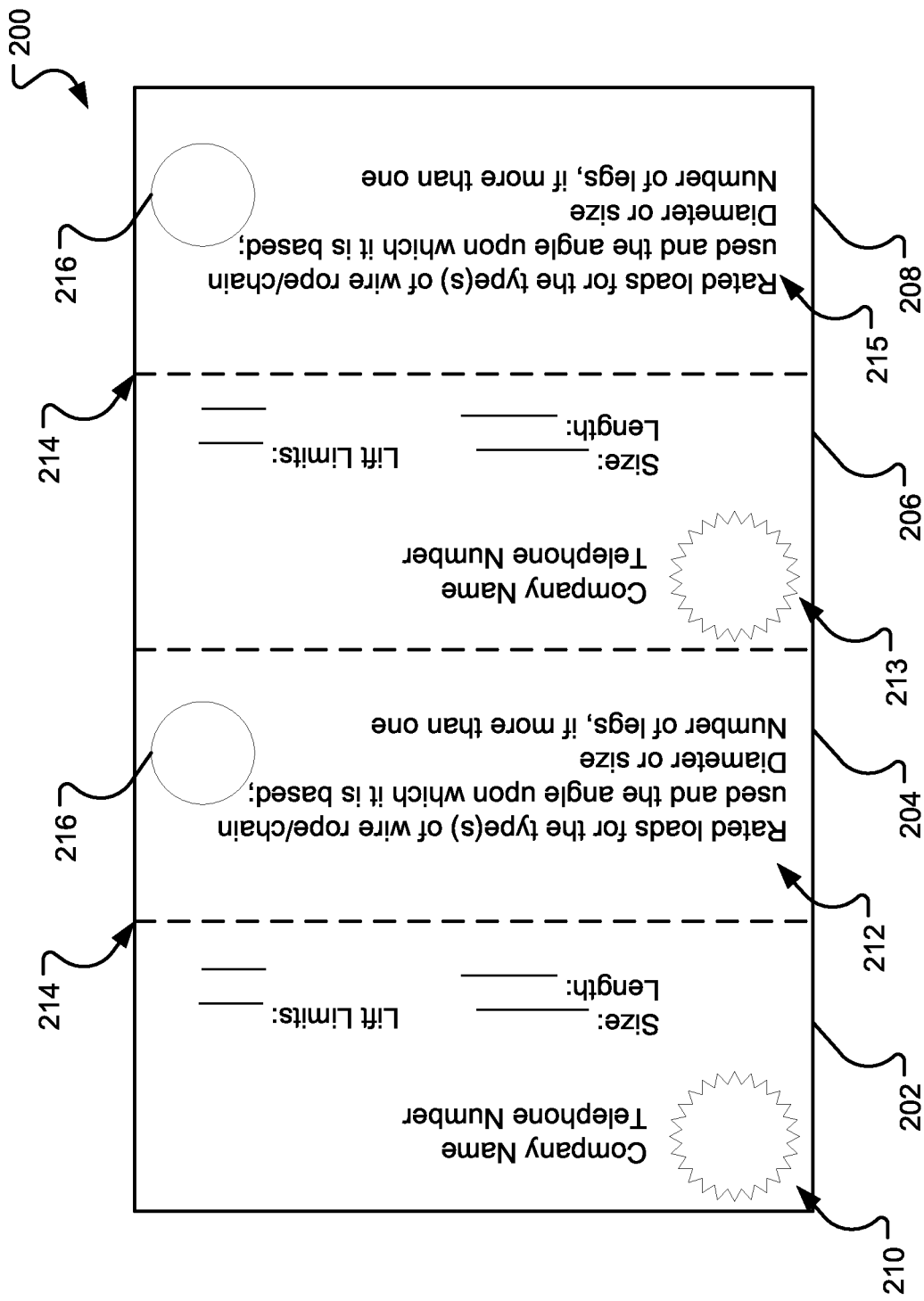
FIG. 2 is a top view of a flat, chemically etched wire rope tag for folding into a tube tag in accordance with one embodiment.
Figure 3:
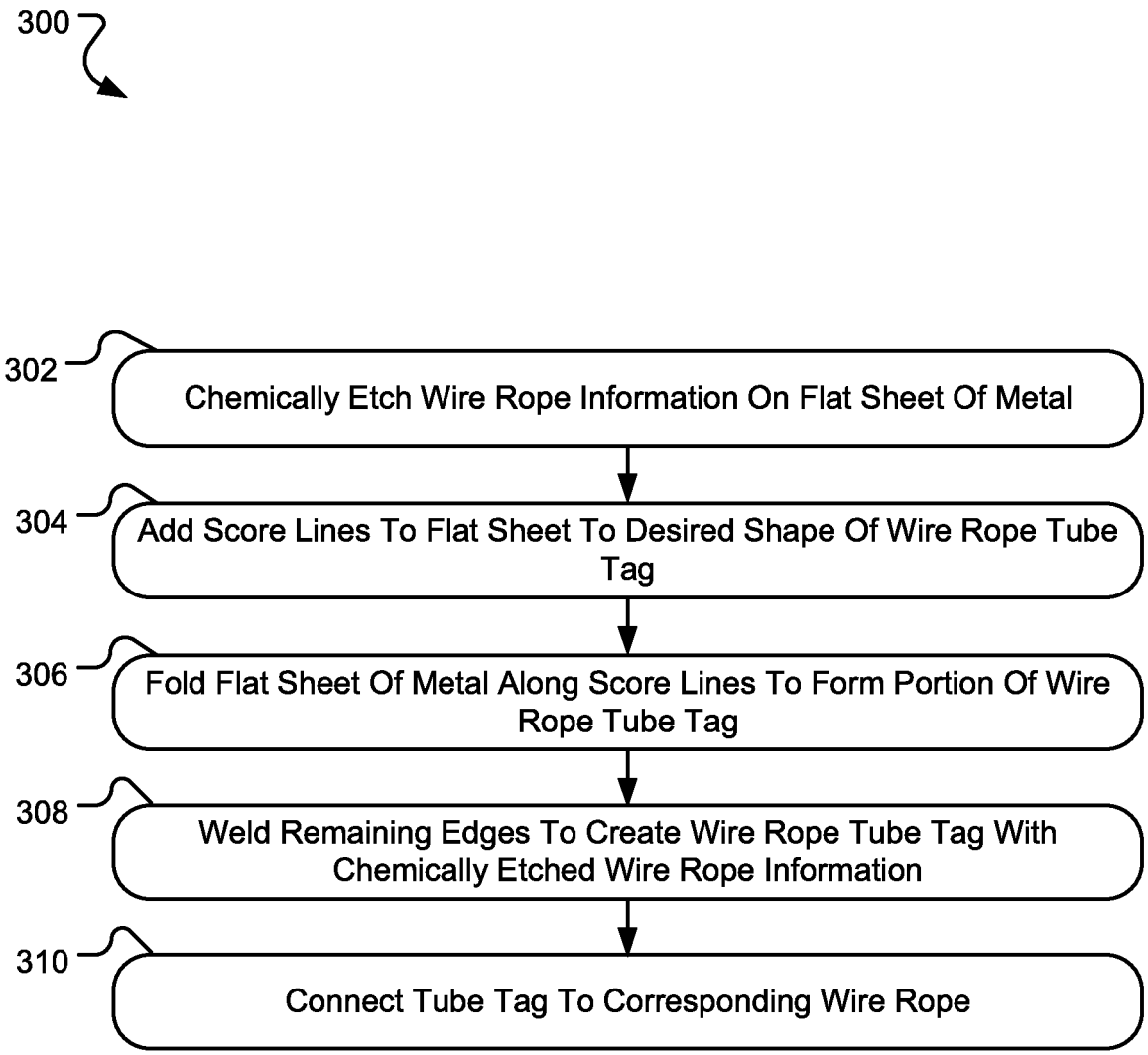
FIG. 3 is a flowchart of a method for generating a tube or cylindrical wire rope tag that allows for chemically etched graphics on the tag in accordance with one embodiment.

FIG. 2 is a schematic diagram illustrating a flat, chemically etched wire rope tag 200 for folding into a tube tag in accordance with one embodiment and FIG. 3 is a flowchart of a method for generating such a tube or cylindrical wire rope tag that allows for chemically etched graphics on the tag in accordance with one embodiment. Through execution of the operations of the method 300 of FIG. 3, the flat sheet 200 of FIG. 2 may be folded to form a wire rope tube tag with chemically etched wire rope information on the outer surface of the tube tag. A folded tube tag generating system may, in operation 302, chemically etch the flat sheet of metal with information corresponding to a wire rope, such as a diameter of the wire rope, a length of the wire rope, and one or more lifting capacities of the wire rope. In addition, the wire rope information etched on the flat sheet of metal may include information concerning a manufacturer or user of the wire rope, such as a graphic or logo of the manufacturing company, an address of the company, a phone number of the company, etc. The flat sheet of metal may be any type of material, including aluminum or steel and may be of various thicknesses or sizes. The size and shape of the flat sheet of metal may be selected to provide a particular form to the tube tag described below. In one example, a chemical etching masking process may be used by which the flat metal sheet 200 is chemically etched with a heated acid spray, painted, and baked. The etching mask acts as a paint mask to form the information 204 on one surface of the sheet 200. Through this process, graphics and/or text may be embedded below the surface of the sheet 200 to enhance the durability of the information chemically etched onto the tag. In some instances, multiple tags may be printed on a sheet of flat metal 200 with different wire rope information for varying types of wire ropes to receive the tube tags.

As shown in FIG. 2, the flat sheet of metal 200 may be etched with information corresponding to a wire rope or a manufacturer or user of the wire rope. In the example shown, a first portion 202 of the flat sheet includes a company logo, company name, and company telephone number associated with the wire rope. The first portion 202 may also include various information of the corresponding wire rope, such as a rope size, rope length, and one or more limits or capabilities of the wire rope. This information may be etched or printed onto the first portion 202 as described below. A second portion 204 of the flat sheet 200 may include the same or different wire rope information 212. In some instances, the information included on the wire rope tag is defined and required by one or more governing bodies. For example, a governing body may require such information as the related loads for the types of hitches used, a diameter or size of the wire rope, a number of legs used for lifting, if more than one, and the like. This second type of information 212 may be etched or printed on the second portion 204 such that the information 210 in one portion 202 may be different than the information 212 in a second portion 204. A third printed portion 206 and a fourth printed portion 208 may also be included with the same or different information as the first portion 202 and/or second portion 204. In general, any number of printed portions may be included in the flat sheet and any type of wire rope information may be included on the portions. Further, both sides of the flat sheet of metal may include printed portions. Also, the flat sheet 200 may include printed portions for more than one tube tag, with some or each of the multiple tube tags including differing information or logos. For example, a flat sheet 200 may include several instances of the information included in the example of FIG. 2. When multiple versions of tube tag information is included on a single sheet, the flat sheet 200 may be cut into pieces, with each cut piece including the tube tag information for creating multiple wire rope tube tags.

In one example, the information 210, 212 on the surface may be chemically etched onto the flat sheet of metal 200. One such chemically etching process may include printing the flat sheet 200 with a chemical etching mask and treating the sheet 200 with a heated acid spray under pressure. The entire flat sheet 200 may be painted with a selected color and baked. The etching mask acts as a paint mask as the sheet 200 is soaked in a heated solvent tank. The solvent strips the mask and paint from the sheet 200 while the paint on the chemically treated areas remain. Through this process, the painted graphics and text from the chemical etching are deposited below the surface of the flat sheet 200, improving the durability of the information printed onto the flat sheet 200.

The flat sheet 200 may include one or more holes 216 that extend through the sheet 200 for attaching to a wire rope upon forming into a tube shape. The holes may be located in any position on the metal sheet 200 and may be any size. In some instances, a plurality of holes 216 may be included that are mirrored on two or more portions 202-208 of the metal sheet 200. Upon folding, the attachment holes 216 may be located on opposite, corresponding sides of the tube tag such that a tie or wire may be fed through the holes 216 for attachment to the corresponding wire rope. The use of the attachment holes 216 are described in more detail below.

In operation 304, one or more score lines or folds may be cut into or otherwise indicated on the flat sheet 200 of metal. In general, the score lines 214 may aid in folding of the flat sheet 200 to form a tube tag for a corresponding wire rope or sling. The score lines 214 of FIG. 2 provide lines along with the flat sheet 200 may be folded into a cubic tube tag. However, other tube shapes may also be formed from the flat sheet 200 with corresponding score lines or not. For example, a triangular tube tag may be formed with two score lines 214 such that, when folded and welded together, a triangular tube tag. Similar tube tags with five, six, or more sides may also be formed from the flat sheet 200, as explained in more detail below. A cylindrical tube tag may include no score lines as the bending or folding of the flat sheet 200 to form the tube tag may not include any corners or edges. Further still, the flat sheet 200 may not include any score lines regardless of the intended tube tag shape. Rather, the flat sheet 200 may remain a single piece from which folds or edges may be formed by bending the sheet 200 as desired. In some instances, the score lines 214 may be stitched cut into the flat sheet 200 with a laser or other type of metal cutting device.

Figure 4:
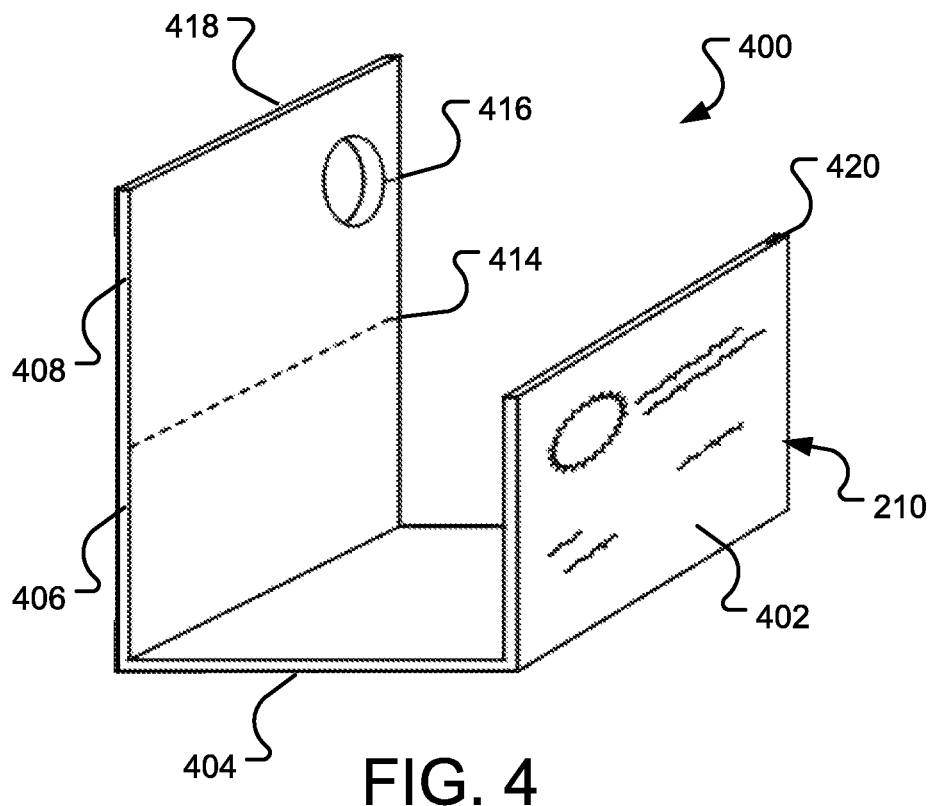
FIG. 4 is an isometric view of a partially folded wire rope tag in accordance with one embodiment.

In operation 306, the flat, metal sheet 200 may be folded along the score lines 214 or, in the case where no score lines are included, folded to form a partial wire rope tube tag. For example, FIG. 4 is an isometric view of a partially folded wire rope tag 400 in accordance with one embodiment. In particular, the partially folded wire rope tag 400 may be formed from the flat sheet 200 illustrated and discussed with reference to FIG. 2. The flat sheet 200 of FIG. 2 may be folded along two of the three score lines 214 to form three sides of the partially folded tube tag 400 of FIG. 4. Namely, the first portion 202 of the flat sheet 200 may form a first portion 402 of the tube tag 400, the second portion 204 of the flat sheet 200 may form a second portion 404 of the tube tag 400, the third portion 206 of the flat sheet 200 may form a third portion 406 of the tube tag 400, and the fourth portion 208 of the flat sheet 200 may form a fourth portion 408 of the tube tag 400. The flat sheet 200 may be folded such that the chemically etched surfaces are located on the outer surface of the tube tag 400 for visibility of the etched information. Thus, etched information 210 may appear on the outer surface of the first portion 402 of the tube tag 400, etched information 212 may appear on the outer surface of the second portion 404 of the tube tag 400, etched information 213 may appear on the outer surface of the third portion 406 of the tube tag 400, and etched information 215 may appear on the outer surface of the fourth portion 408 of the tube tag 400. Similar bending or folding may occur for other tube tags with other shapes, such as cylindrical bending of the flat sheet 200 or folding of the flat surface along two fold lines to form a triangular tube shape. The one or more attachment holes 416 included on the flat sheet 200 is also illustrated for attaching the tube tag 400 to a wire rope, as discussed in more detail below.

Figure 5:
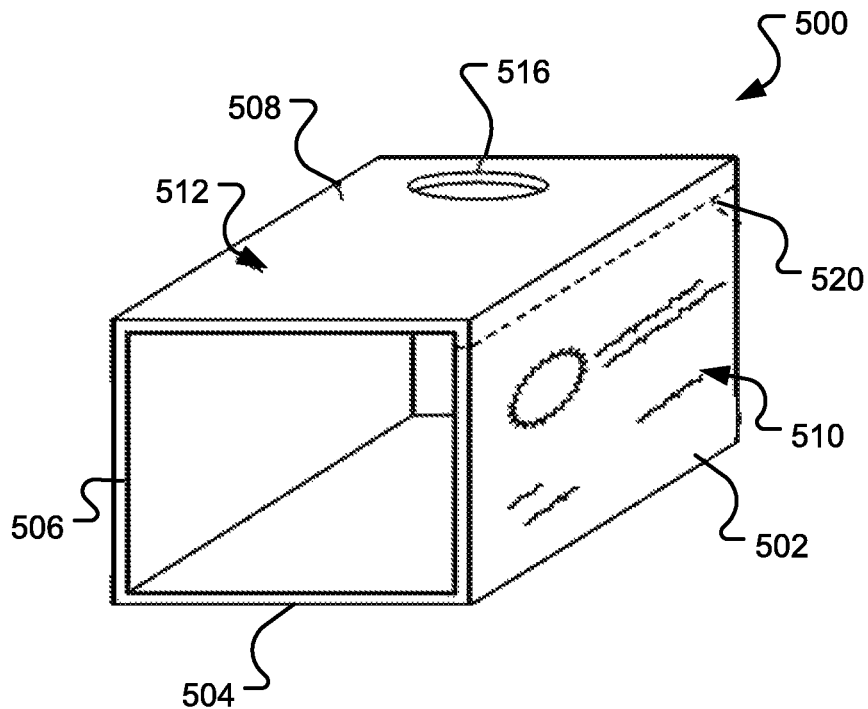
FIG. 5 is an isometric view of a welded, folded wire rope tag in accordance with one embodiment.

In operation 308, the edges of the partially folded tube tag 400 may be brought together (through bending or folding of the tag, such as along a score line 414) and connected in some manner to form a tube-shaped tag. For example, FIG. 5 is an isometric view of a welded, folded wire rope tag in accordance with one embodiment. In the example shown, the free edges 418, 420 of the partially folded tube tag 400 may be welded together along weld line 520 to form the enclosed tube tag 500. The weld line 520 may be formed from a spot weld technique, a tack weld technique, a full weld technique, or any other type of welding depending on the durability needs of the tube tag. Other techniques to connect the free ends of the tube tag 500 may also be employed, including not attaching the ends together. In some instances, a wire rope corresponding to the information etched into the outer surface of the tube tag 500 may be located through the center of the tube tag 500 such that the tube tag may be welded around the wire rope to attach the tag 500 to the wire rope. As described above, one or more of the outer surfaces 510, 512 of the tube tag 500 may include the chemically etched wire rope information displayed as required for many wire rope tags to visually communicate specifications and limits on the performance of the corresponding wire rope. Other information, such as company logos and information, may also be displayed by the tube tag.

Figure 6:
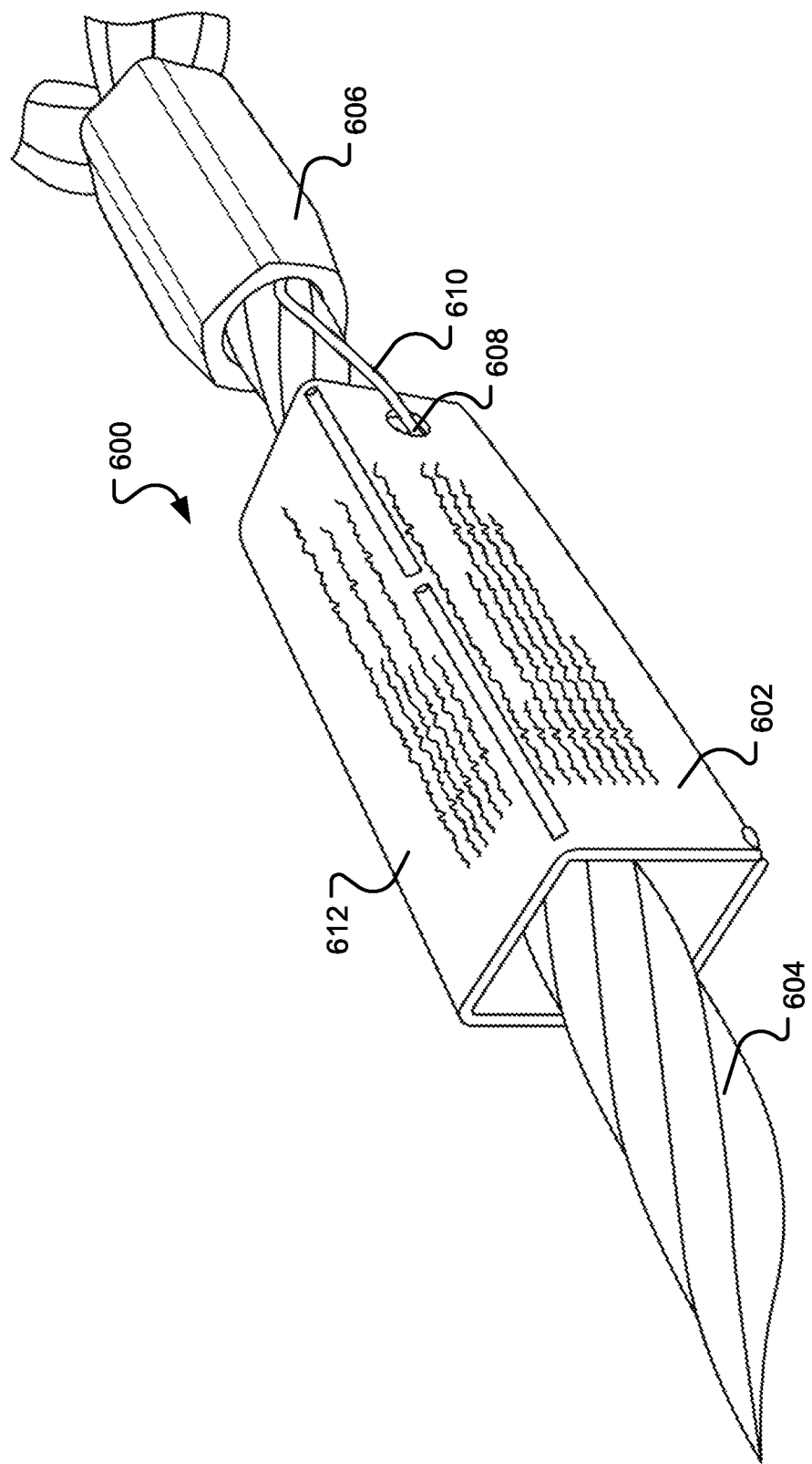
FIG. 6 is an isometric view of a welded, folded wire rope tag attached to a sling cable via an attachment hole in the tag in accordance with one embodiment.

In operation 310, the enclosed tube tag 500 may be attached to a corresponding wire rope to hold the tag on the wire rope during use. For example, FIG. 6 is an isometric view of a welded, folded wire rope tag 600 attached to a sling cable 604 via an attachment hole 608 in the tag in accordance with one embodiment. In particular, the folded tube tag 600 may be a rectangular-shaped tube tag including four sides. One or more of the outer surfaces of the four sides may include information 612 associated with the wire sling 604 that passes through the center of the tube tag such that the tube tag 602 circumvents a cable portion of the wire rope sling. In addition, one or more sides 602 of the tube tag 600 may include an attachment hole 608 through which am attachment thread 610 may extend. The attachment thread 610 may be any kind of wire, cable, or string for attachment of the tube tag 600 to the wire rope sling 604. In one particular example, the attachment thread 610 may include several twisted strands of wire for durability and to prevent snapping of the thread in instances when the tube tag 600 may get snagged during use of the sling 604. One end of the attachment thread 610 may be held against the wire rope sling 604 via a crimp lock or sleeve 606 or other attachment device to attach the attachment thread 610 to the wire rope sling 604.

Figure 7:
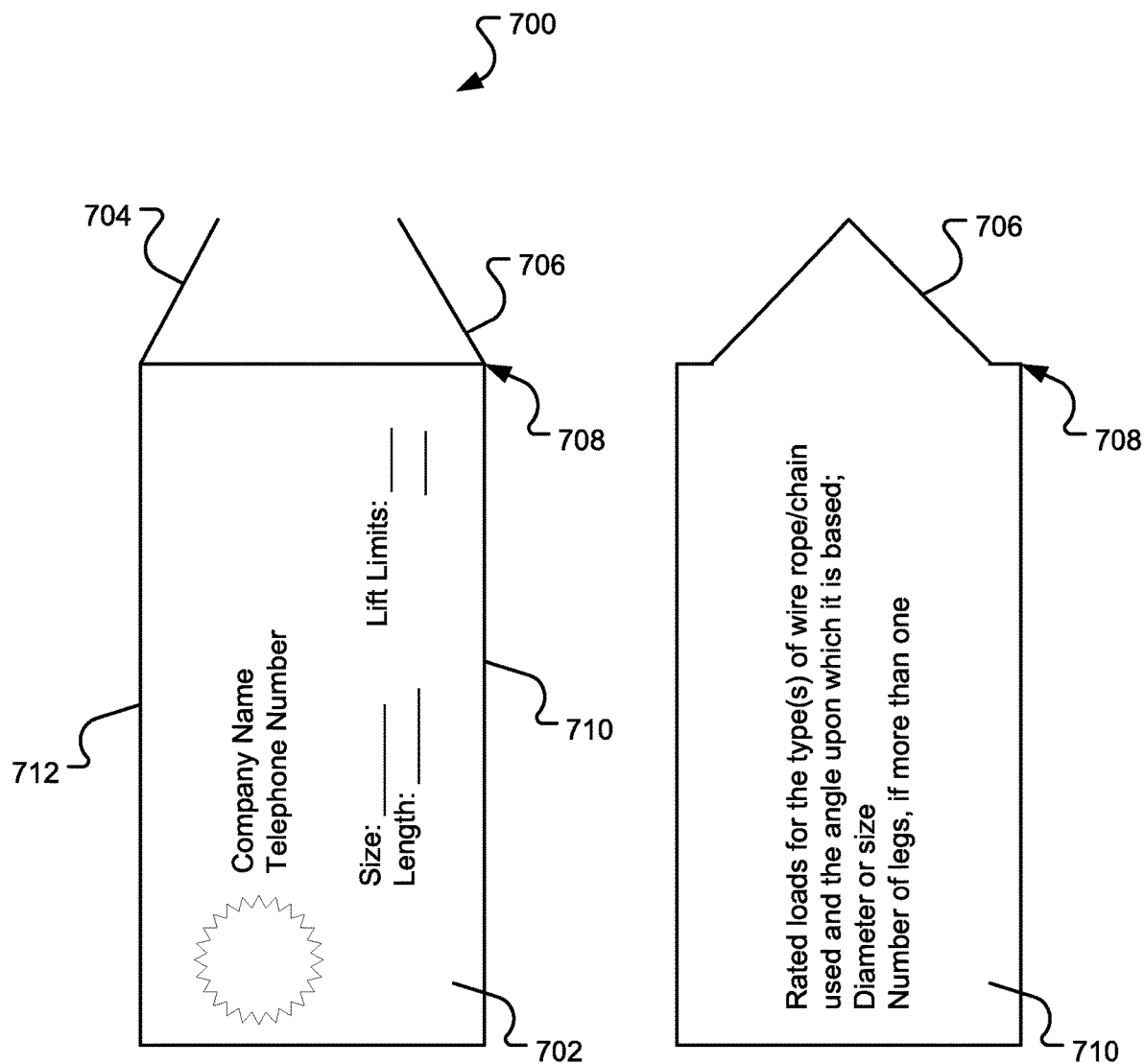
FIG. 7A is a side-view of a welded, folded wire rope tag including attachment tabs extending from an end of the tag in accordance with one embodiment.
FIG. 7B is a front-view of a welded, folded wire rope tag including attachment tabs extending from an end of the tag in accordance with one embodiment.
Figure 8:
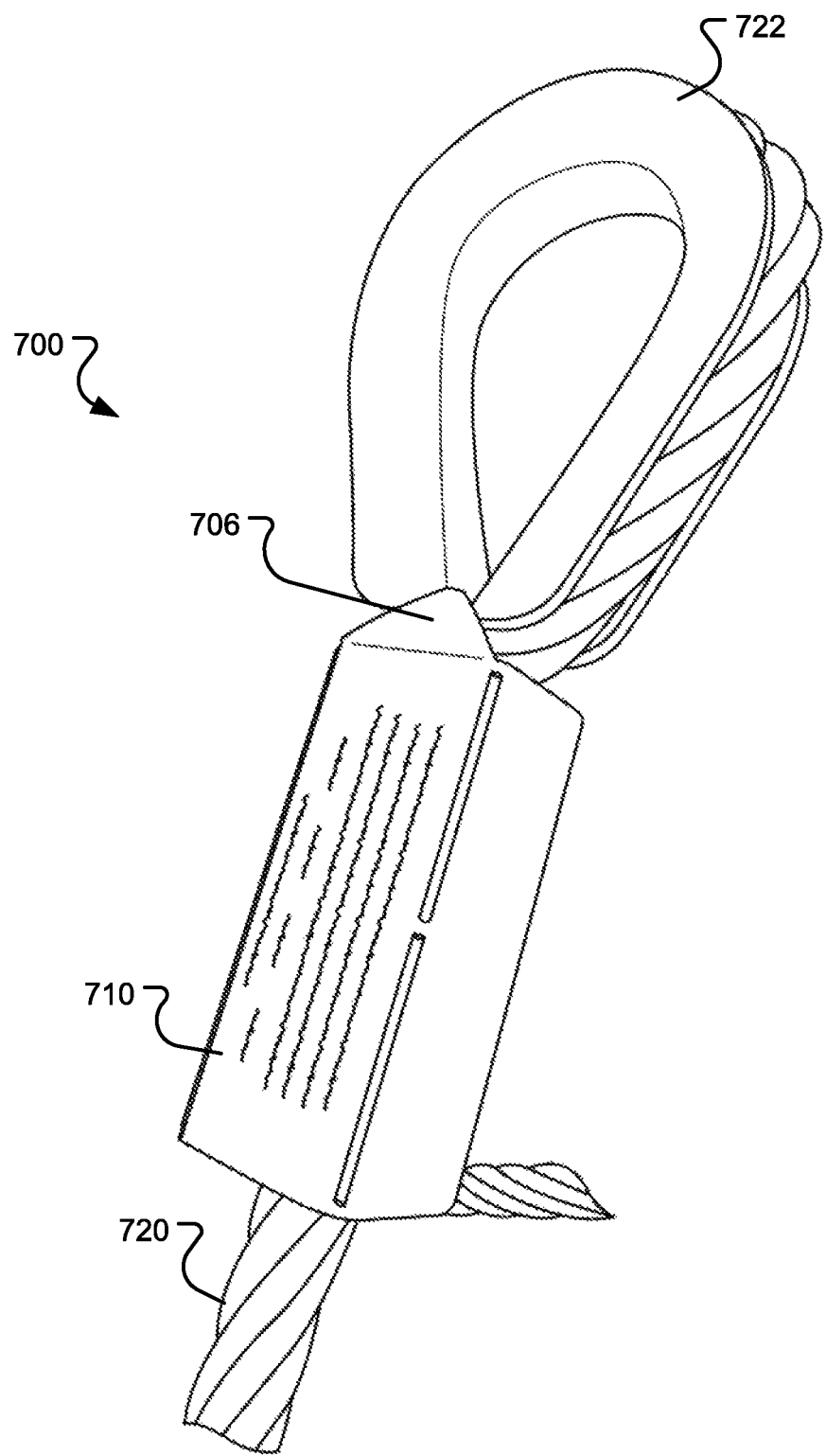
FIG. 8 is an isometric view of a welded, folded wire rope tag attached to a sling cable via attachment tabs in accordance with one embodiment.

Another example of an attachment mechanism of the tube tag may include one or more tabs extending from an end 708 of the folded tube tag 700 that may be bent or folded toward the wire rope to create a pinching force on the wire rope to hold the tag in place. For example, FIG. 7A is a side-view and FIG. 7B is a front view of a welded, folded wire rope tag 700 including attachment tabs 704,706 extending from an end 708 of the tag 700 in accordance with one embodiment. The illustrated tube tag 700 is a rectangular tube tag, although the attachment tabs 704,706 may be included with any shaped tube tag discussed herein. The attachment tabs 704,706 may include two or more projections extending from at least one end 708 of the tube tag and positioned in opposition. For example, the tabs 704,706 may extend from side 710 and side 712 of the tube tag 700. A front side 702 of the tube tag 700 may not include an attachment tab. The attachment tabs 704,706 may take many shapes and, in one particular example, may be triangular shaped to form a pair of opposing points for applying a pinching force on a wire rope passing through the tube tag 700. In particular, FIG. 8 is an isometric view of the welded, folded wire rope tag 700 of FIG. 7 attached to a sling cable via attachment tabs in accordance with one embodiment. As shown, the tube tag 700 may be placed on the wire rope sling such that a wire rope portion 720 passes through the tube tag 700. The wire rope sling may also include an eyelet 722 portion for connecting to one or more lifting apparatuses. To attach the tube tag 700 to the wire rope sling, the attachment tabs 704,706 may be bent to engage a bottom end of the eyelet 722 of the wire rope sling to create a pinching force against the wire rope 720 or eyelet 722. As shown in FIG. 8, tab 706 is bent inwardly to engage the wire rope 720 and/or eyelet 722 assembly. The corresponding tab 704 may also be bent to engage the wire rope 720 or eyelet 722 such that the tabs 704,706 pinch against the eyelet 722 and/or wire rope 720 to hold the tube tag 700 in place on the wire rope sling.

Still other attachment mechanisms may be present on the tube tag for attaching the tag to a wire rope sling. In particular, a tube tag may be placed on the wire rope sling such that the wire rope portion of the sling extends through the tube tag. The tube tag may include one or more attachment holes through the body of the tube tag at an end proximal to the eyelet portion of the wire rope sling. In one implementation, a first attachment hole may be disposed in one side of the tube tag body, similar to the tube tag illustrated in FIG. 6, and a second attachment hole may be disposed in an opposite side of the tube tag to create a pair of attachment holes on opposing sides of the tag. A connector may be fed through one or both of the attachment holes and through the eyelet of the wire rope sling to attach the tube tag to the eyelet. In one particular example, a zip tie may be fed through the attachment holes and the eyelet portion. In this manner, the tube tag may be attached to the sling through utilization of one or more attachment holes. In still other instances, the tube tag may be attached to the wire rope sling via a combination of attachment holes and attachment tabs. For example, a tube tag may include attachment tabs bent around a portion of the eyelet of the wire rope sling and one or more attachment holes through which an attachment thread or string is passed and attached to the wire rope sling. The additional attachment procedures further ensure durability of the tube tag to remain attached to the wire rope sling during use of the sling.

Figure 9:
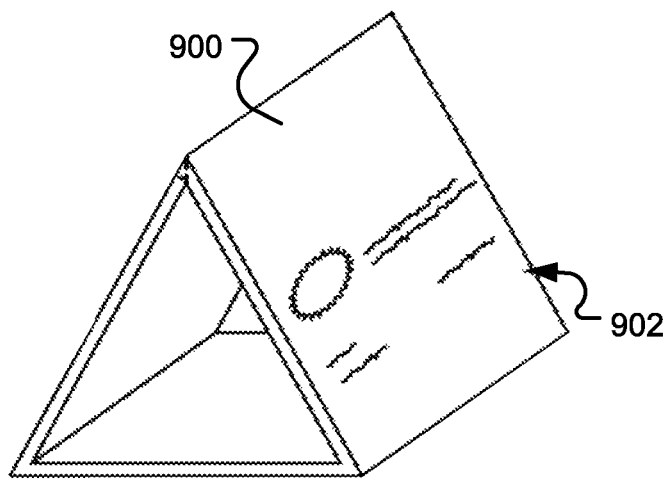
FIG. 9 is an isometric view of a three-sided folded wire rope tag in accordance with one embodiment.
Figure 10:
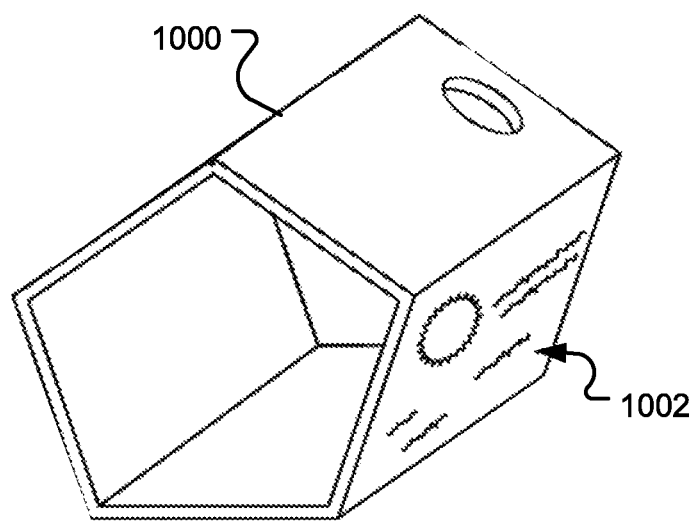
FIG. 10 is an isometric view of a five-sided folded wire rope tag in accordance with one embodiment.
Figure 11:
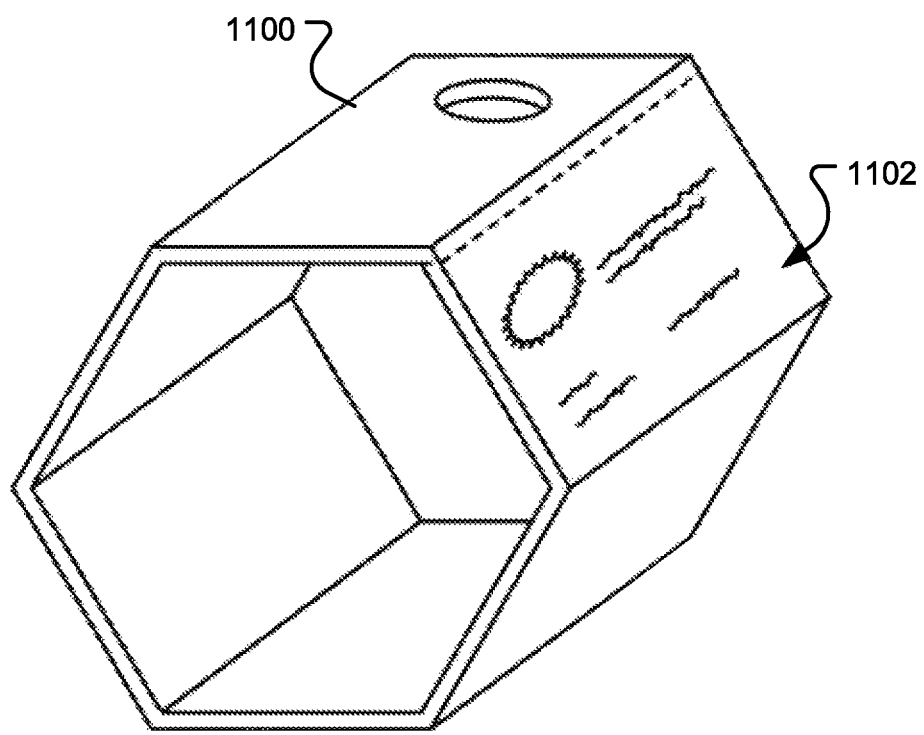
FIG. 11 is an isometric view of a six-sided folded wire rope tag in accordance with one embodiment.

Although discussed and shown herein as including four sides, it is contemplated that the tube tag may be formed to include any number of sides. For example, FIG. 9 is an isometric view of a three-sided folded wire rope tag 900 in accordance with one embodiment, FIG. 10 is an isometric view of a five-sided folded wire rope tag 1000 in accordance with one embodiment, and FIG. 11 is an isometric view of a six-sided folded wire rope tag 1100 in accordance with one embodiment. Each of the various implementations illustrated in FIGS. 9-11 may include outer surfaces, each with or without markings or information. Similar to the four-sided the tube tag discussed above, the three-sided tube tag 900, five-sided tube tag 1000, and six-sided tube tag 1100 may be formed from a flat sheet of metal that is folded along one or more fold lines, with the remaining ends being welded or otherwise connected, to create the corresponding tube structure. Tube tags with more than six sides are also contemplated and may be created in a similar manner through the folding of a flat sheet of metal. Also similar to above, the three-sided tube tag 900, five-sided tube tag 1000, and six-sided tube tag 1100 may each include chemically-etched information, or other ways to display information, such as etching, printing, etc., included on the outer surfaces of the respective tube tag. For example, outer surface 902 of the three-sided tube tag 900 may include information displayed on the surface. Such information may be associated with the wire rope sling on which the tube tag 900 is attached. An outer surface 1002 of the five-sided tube tag 1000 and an outer surface 1102 of the six-sided tube tag 1100 may similarly include information associated with the wire rope sling displayed on the surface. The method of including the information on the outer surface of the tube tags 900-11000 may be any method described herein.

In yet another implementation, any of the tube tags discussed herein may include a radio-frequency identification (RFID) device attached to or included with the tube tag. For example, the tube tag 500 of FIG. 5 may include an RFID device attached to an inner or outer surface of the tube tag. The RFID device may include information that, when triggered by electromagnetic interrogation pulse from an RFID reader or is powered through a battery connected to the RFID device, is transmitted by the RFID device that identifies the tube tag and/or the corresponding wire rope sling to which the tube tag is attached. The RFID device may allow for tracking of wire rope slings via the information included and broadcast by the RFID device of the tube tag as a database of RFID device information may be stored and obtained to determine a history or location of wire rope slings.

Embodiments of the present disclosure include various steps, which are described in this specification. The steps may be performed by hardware components or may be embodied in machine-executable instructions, which may be used to cause a general-purpose or special-purpose processor programmed with the instructions to perform the steps. Alternatively, the steps may be performed by a combination of hardware, software and/or firmware.

Various modifications and additions can be made to the exemplary embodiments discussed without departing from the scope of the present invention. For example, while the embodiments described above refer to particular features, the scope of this invention also includes embodiments having different combinations of features and embodiments that do not include all of the described features. Accordingly, the scope of the present invention is intended to embrace all such alternatives, modifications, and variations together with all equivalents thereof.

We claim:

1. A tag for a wire rope sling, the tag comprising:
a flat sheet of metal with an etched surface, the flat sheet of metal folded to form a tube-shaped wire rope tag, the etched surface forming at least a portion of an outer surface of the tube-shaped wire rope tag;
a first edge;
a second edge opposite the first edge, the first edge welded to the second edge to form the tube-shaped wire rope tag; and
a first attachment tab and a second attachment tab,
wherein, when folded, the tube-shaped wire rope tag includes a first open end and a second open end in which a wire rope portion of the wire rope sling passes through the first open end and the second open end,
wherein the etched surface includes information corresponding to the wire rope sling, and
wherein each of the first attachment tab and the second attachment tab extends from a first end of the folded tube-shaped wire rope tag, the first attachment tab and the second attachment tab being on opposite sides of the folded tube-shaped wire rope tag.

2. The tag of claim 1, wherein the tube-shaped wire rope tag comprises three sides.

3. The tag of claim 1, wherein the tube-shaped wire rope tag comprises five sides.

4. The tag of claim 1, wherein the tube-shaped wire rope tag comprises six sides.

5. The tag of claim 1, further comprising:
a first attachment hole in a first portion of the etched surface, wherein an attachment cable is fed through the first attachment hole and connects to the wire rope portion of the wire rope sling.

6. The tag of claim 5, further comprising:
a second attachment hole in a second portion of the etched surface, wherein the attachment cable is fed through the first attachment hole and the second attachment hole and connects to the wire rope portion of the wire rope sling.

7. The tag of claim 1, wherein each of the first attachment tab and the second attachment tab are biased toward a center of the folded tube-shaped wire rope tag, the attachment tabs creating a pinching force on the wire rope portion of the wire rope sling passing through the first open end and the second open end.

8. The tag of claim 1, further comprising:
a radio-frequency identification device to transmit identification information corresponding to the folded tube-shaped wire rope tag.

9. The tag of claim 1, wherein the information corresponding to the wire rope sling is chemically-etched into the outer surface and comprises load-bearing limitations of the wire rope sling.

10. The tag of claim 9, wherein the information corresponding to the wire rope sling further comprises one or more graphical design objects.

11. A tube-shaped wire rope tag for a wire rope sling, the tube-shaped wire rope tag comprising:
a flat sheet of metal with an etchable surface folded to form a tube-shaped wire rope tag, the etchable surface forming at least a portion of an outer surface of the tube-shaped wire rope tag,
wherein,
the tube-shaped wire rope tag includes a first edge secured to a second edge to form the tube-shaped wire rope tag,
the tube-shaped wire rope tag includes a first open end and a second open end operable to receive a portion of a wire rope sling is operable to pass through the first open end and the second open end,
the tube-shaped wire rope tag includes a first attachment tab and a second attachment tab,
each of the first attachment tab and the second attachment tab extends from a first end of the folded tube-shaped wire rope tag,
the first attachment tab and the second attachment tab are on opposite sides of the folded tube-shaped wire rope tag, and
each of the first attachment tab and the second attachment tab is operable to be biased toward a center of the tube-shaped wire rope tag to create a pinching force on the wire rope sling.

12. The tube-shaped wire rope tag of claim 11, wherein the tube-shaped wire rope tag has three sides.

13. The tube-shaped wire rope tag of claim 11, wherein the tube-shaped wire rope tag has four sides.

14. The tube-shaped wire rope tag of claim 11, wherein the tube-shaped wire rope tag has five sides.

15. The tube-shaped wire rope tag of claim 11, wherein the tube-shaped wire rope tag has six sides.

16. The tube-shaped wire rope tag of claim 11, wherein the etchable surface includes information corresponding to the wire rope sling.

17. The tube-shaped wire rope tag of claim 16, wherein the information corresponding to the wire rope sling is chemically-etched into the outer surface.

18. The tube-shaped wire rope tag of claim 16, wherein the information corresponding to the wire rope sling comprises load-bearing limitations of the wire rope sling.

19. The tube-shaped wire rope tag of claim 16, wherein the information corresponding to the wire rope sling comprises one or more graphical design objects.

20. The tube-shaped wire rope tag of claim 11, wherein the flat sheet of metal is folded to form the tube-shaped wire rope tag along a plurality of fold lines that aid in folding the flat sheet of metal.

* * * * *